United States Patent
Cairo et al.

(10) Patent No.: US 7,506,822 B2
(45) Date of Patent: Mar. 24, 2009

(54) SLURRY INJECTOR AND METHODS OF USE THEREOF

(75) Inventors: Ronald Ralph Cairo, Greer, SC (US); Henry Choisun Chan, Bellaire, TX (US); Wei Chen, Sugar Land, TX (US)

(73) Assignee: General Electric Company, Schenectady, NY (US)

( * ) Notice: Subject to any disclaimer, the term of this patent is extended or adjusted under 35 U.S.C. 154(b) by 368 days.

(21) Appl. No.: 11/379,889

(22) Filed: Apr. 24, 2006

(65) Prior Publication Data

US 2007/0246575 A1 Oct. 25, 2007

(51) Int. Cl.
- A01G 25/09 (2006.01)
- B05B 17/00 (2006.01)
- B05B 7/06 (2006.01)
- B05B 1/00 (2006.01)
- F23D 11/10 (2006.01)
- F23D 11/40 (2006.01)
- F23D 14/62 (2006.01)

(52) U.S. Cl. .................. 239/1; 239/418; 239/423; 239/424; 239/424.5; 239/425; 239/591; 239/600

(58) Field of Classification Search .............. 239/418, 239/422, 423, 424, 424.5, 425, 591, 1, 600
See application file for complete search history.

(56) References Cited

U.S. PATENT DOCUMENTS

| 3,841,567 A | * | 10/1974 | Drozek et al. ............ 239/570 |
| 4,421,722 A | * | 12/1983 | Massey et al. ........... 422/129 |
| 4,443,228 A | * | 4/1984 | Schlinger ................. 48/86 R |
| 4,819,878 A | * | 4/1989 | Bailey et al. ............ 239/427 |
| 5,474,235 A | | 12/1995 | Cole et al. |
| 6,276,611 B1 | * | 8/2001 | Brooker et al. ............. 239/5 |

OTHER PUBLICATIONS

Japanese Patent No. 10094742 A; Apr. 14, 1998; Abstract Only; 1 page.

* cited by examiner

*Primary Examiner*—Len Tran
*Assistant Examiner*—Ryan Reis
(74) *Attorney, Agent, or Firm*—Cantor Colburn LLP

(57) ABSTRACT

Disclosed herein are injectors and methods for use thereof. In one embodiment the injector comprises: an inner tip, a slurry tip disposed around the inner tip forming a second flow channel, and a wear insert disposed within the slurry tip and in contact with the second flow channel. The inner tip comprises a first flow channel attached to a first supply conduit that can supply a first media to the first flow channel. Attached to the slurry tip is a second supply conduit, which can supply a second media to the second flow channel. The wear insert comprises a metal oxide.

16 Claims, 4 Drawing Sheets

SLURRY INJECTOR AND METHODS OF USE THEREOF

TECHNICAL FIELD

This disclosure generally relates to slurry injectors, more specifically, slurry injectors for use with coal gasification reactors.

BACKGROUND

A slurry injector can be employed in a variety of applications wherein a liquid media, comprising an insoluble component, is dispersed, diffused, and/or introduced from one environment to another. One such application is in coal gasification reactors wherein a coal slurry feedstock is introduced into a gasification reactor via a slurry injector. In applications such as this, slurry injectors are prone to erosion due to friction imparted by the insoluble component within the slurry on the internal surfaces of the injector. The occurrence of erosion can result in improper metering, a poor injection plume, and so forth, which increase maintenance costs and lowers operating efficiencies or availability.

To reduce the rate of erosion, the injectors can be formed of erosion-resistant alloys such as cobalt-chromium superalloys, nickel-chromium superalloys, and the like. These erosion-resistant alloys decrease the rate of erosion compared to softer metallic alloys, such as stainless steel; however, they are still prone to erosion. As a result, what is needed in the art is slurry injectors having improved erosion resistance to reduce maintenance costs and increase operating efficiency.

BRIEF SUMMARY

Disclosed herein are slurry injectors.

In one embodiment an injector is disclosed. The injector comprises an inner tip, a slurry tip disposed around the inner tip forming a second flow channel, and a wear insert disposed within the slurry tip and in contact with the second flow channel. The inner tip comprises a first flow channel attached to a first supply conduit that can supply a first media to the first flow channel. Attached to the slurry tip is a second supply conduit, which can supply a second media to the second flow channel. The wear insert comprises a metal oxide.

In a second embodiment a method of injector operation is disclosed. The method comprises, a passing a first media through a first flow channel, wherein the first flow channel is within an inner tip, passing a second media through a second flow channel, wherein the second flow channel is disposed between the inner tip and a slurry tip, wherein the slurry tip comprises a wear insert disposed in contact with the second media, and mixing the first media and second media.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

Disclosed herein are slurry injectors having improved erosion-resistance. Erosion resistance has been improved by incorporating erosion-resistant components and/or inserts. To be more specific, slurry injectors are disclosed that comprise ceramic insert(s) that protect the metallic tips from the slurry flow path thereby providing improved erosion resistance. Modified slurry injectors are also disclosed wherein the injector's tip(s) are formed from ceramic materials, which provide improved erosion resistance.

At the outset, unless defined otherwise, technical and scientific terms used herein have the same meaning as is commonly understood by one of skill in the art to which this invention belongs. The terms "first", "second", and "the like", as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation. If ranges are disclosed, the endpoints of all ranges directed to the same component or property are inclusive and independently combinable (e.g., ranges of "up to about 25 wt. %, or, more specifically, about 5 wt. % to about 20 wt. %," is inclusive of the endpoints and all intermediate values of the ranges of "about 5 wt. % to about 25 wt. %," etc.). The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., "the colorant(s)" includes one or more colorants). Furthermore, the term "combination" is inclusive of blends, mixtures, alloys, oxides, copolymers, reaction products, and the like.

Figure 1:
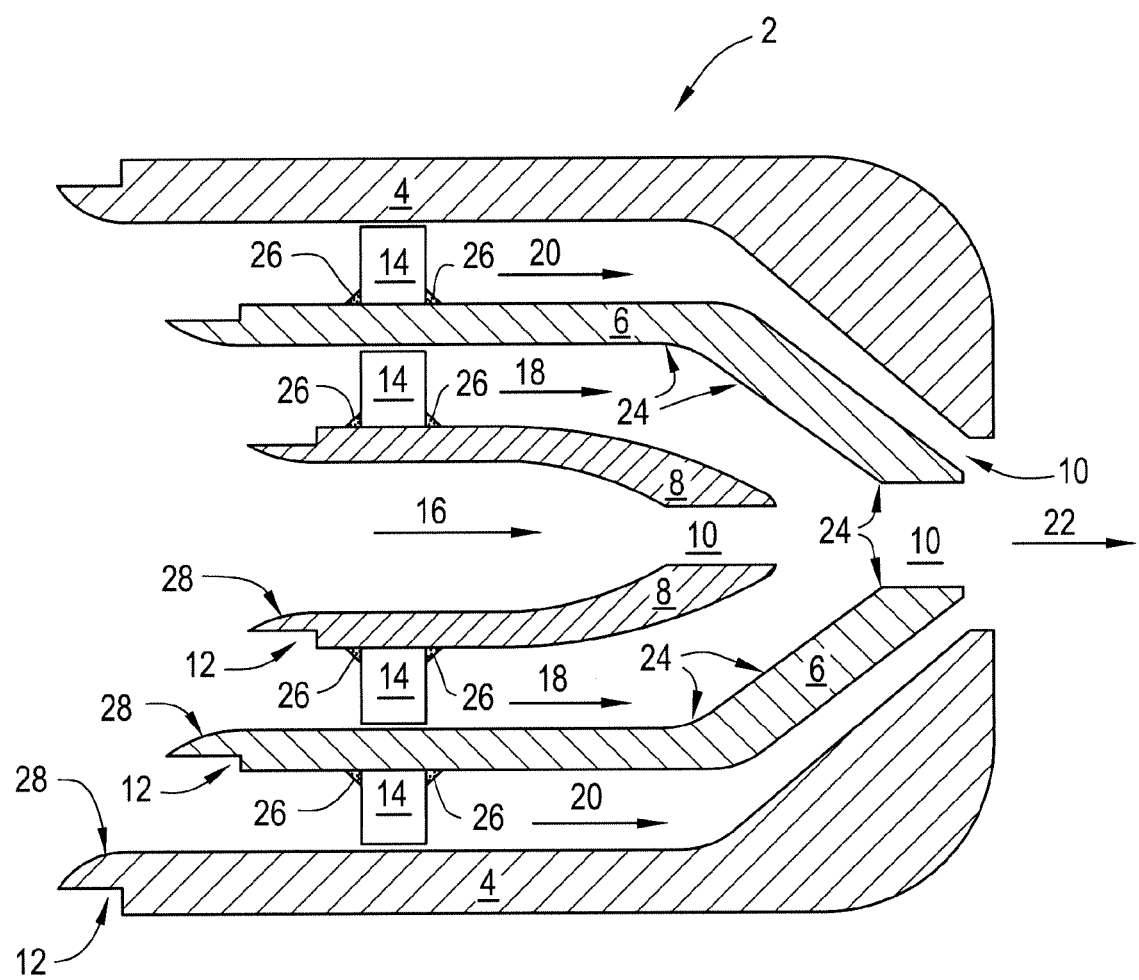
FIG. 1 is a cross-sectional view of an exemplary standard injector.

FIG. 1, illustrates a cross-sectional view of an exemplary standard injector, which is generally designated 2. In the illustration, the standard injector 2 (also referred to as "injector") has a design that is prone to erosion. To be more specific, the injector 2 comprises an outer tip 4, a slurry tip 6, and an inner tip 8, which can be collectively referred to as the "tips". The tips have annular geometries; wherein the cross-sections illustrated is through their central axis. Flow channels 16, 18, 20 are disposed within each tip that is capable of allowing a liquid (e.g., coal slurry) and/or gaseous (e.g., oxygen) media to travel therethrough. The tips comprise nozzles 10, through which the media traveling within a tip's flow channels 16, 18, 20 (hereinafter referred to as "flow channels") exit the injector to form a plume 22.

Disposed between the inner tip 8 and the slurry tip 6, as well as between the slurry tip 6 and the outer tip 4, are centering ribs 14. The centering ribs 14 (also referred to as "fins") can be employed to concentrically align the tips with respect to one another. The ribs 14 can have any geometry that is capable of concentrically aligning the tips. Although any number of ribs 14 can be employed to maintain concentricity, two or more ribs 14 are employed between each tip. The ribs 14 illustrated in FIG. 1 have a rod-like geometry with an elliptical cross-sectional geometry (not shown). The ribs 14 can be configured to reduce its restriction to flow through the flow channels 16, 18, 20. The ribs 14 are connected to the tips via welding, as illustrated by the weld 26.

The tips comprise a step 12 disposed at the end of the tip opposite the nozzle 10. The step 12 is adapted to connect to a supply conduit (e.g., superalloy tube, not shown). The step 12 has a contoured geometry 28 that minimizes restriction to liquid and/or gas flow within the flow channels 16, 18, 20.

The outer tip 4, slurry tip 6, inner tip 8, and centering ribs 14 comprise metals that are capable of operating at continuous use temperatures of about 70° F. (21° C.) to about 900° F. (482° C.), or, more specifically, up to about 1200° F. (649° C.). However, it is to be understood that the specific operating temperatures encountered by the injector is application specific and can vary. One exemplary family of metals that can be employed is superalloys. Superalloys are generally nickel, iron, or cobalt-based alloys comprising combinations of chromium, tungsten, molybdenum, tantalum, niobium, titanium, and/or aluminum, as well as combinations comprising at least one of the foregoing. For example, a cobalt-chromium superalloy can be employed, such as Stellite® 6B (commercially available from the Deloro-Stellite Company, Swindon, UK), which comprises: cobalt, chromium, nickel, iron, silicon, carbon, molybdenum, and manganese.

Superalloys are capable of providing improved resistance to erosion compared to common metallic alloys (e.g., stainless steels). Superalloys are generally harder than common metallic alloys, having Rockwell hardness values of about 40 to about 50 on the C-scale, and are capable of maintaining their strength at operating temperatures of about 1,200° F. (650° C.), or more. However, even these materials continue to exhibit undesirable erosion rates in some slurry injector applications.

In use, pressurized liquid and/or gaseous media pass through the flow channels 16, 18, 20 and exit the injector 2 as a plume 22 to feed the gasification reactor. In the exemplary embodiment illustrated, oxygen flows through flow channel 16, a coal slurry flows through flow channel 18, and oxygen flows through flow channel 20. The coal slurry flowing within flow channel 18 is erosive due to the non-soluble matter (e.g., coal particles) within the slurry. This non-soluble matter exerts frictional forces (e.g., that erode, cut, wear, and so forth) on the inside surfaces 24 of flow channel 18. The slurry is especially erosive at the slurry tip's nozzle 10 as the slurry velocity and angle of incidence of impact increases as the slurry is forced therethrough.

The rate at which the slurry tip 6 and inner tip 8 are eroded is dependent on the specific operating variables of each application, such as, but not limited to, flow rate, slurry composition, temperature, tip materials, pressure, and so forth. To be more specific, in the exemplary coal slurry injector illustrated in FIG. 1, the processing variable can comprise: flow rates equal to about 1.0 gallon per minute, gpm (3.79 liters per minute, 1 pm) or greater, operating temperatures of about 70° F. to about 1,200° F. (about 21° C. to about 649° C.), peak pressures of about 500 pounds per square inch, $lb/in^2$ (35.2 kilograms per centimeter squared, $kg/cm^2$) to about 5,000 $lb/in^2$ (351.5 $kg/cm^2$), and slurry composition. The slurry can comprise about 20 wt. % to about 80 wt. % pulverized coal solids in aqueous solution.

Figure 2:
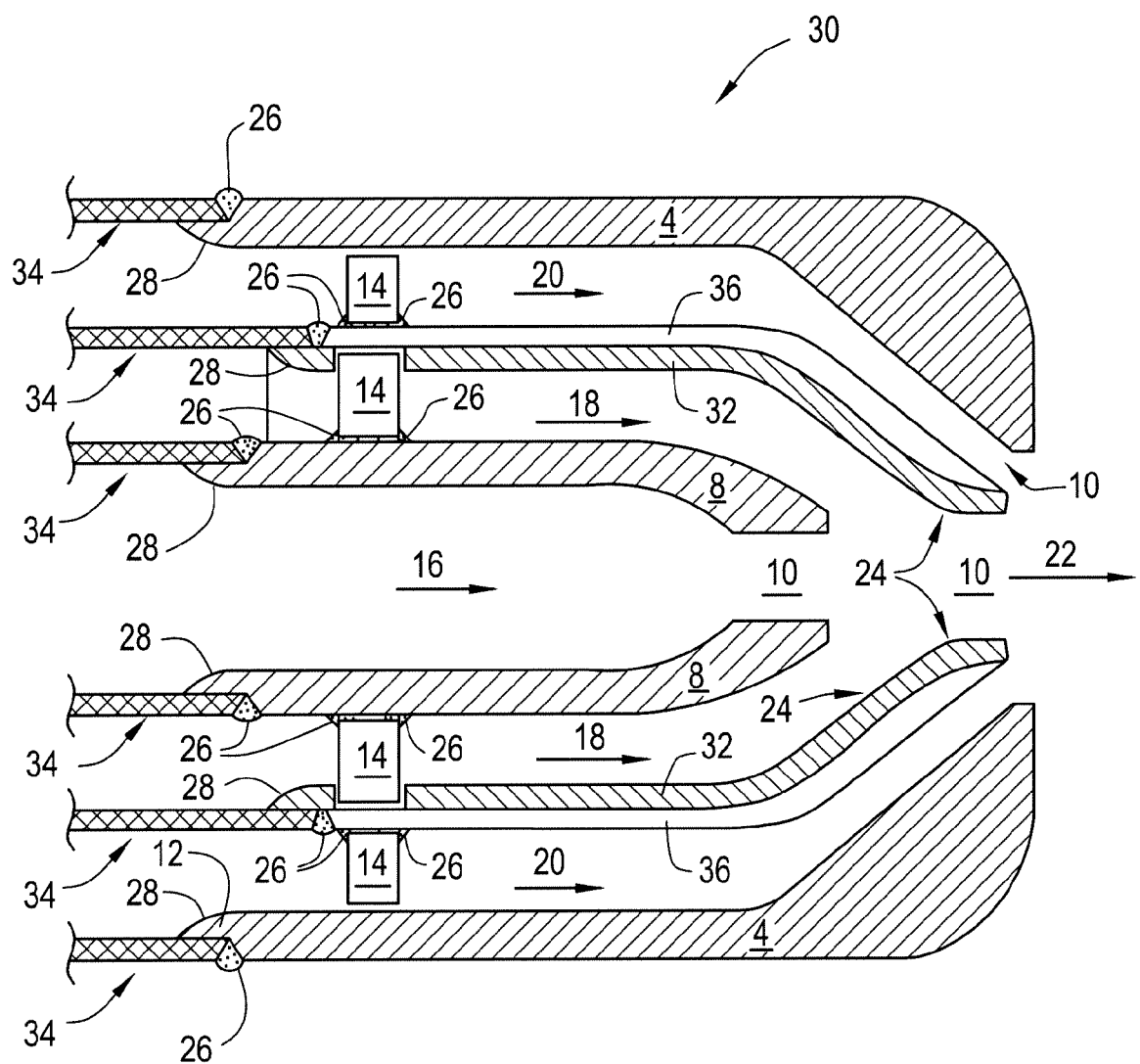
FIG. 2 is a cross-sectional view of an exemplary modified injector.

Refer now to FIG. 2, which illustrates a cross-sectional view of an exemplary modified injector, generally designated 30. In the illustration, the modified injector 30 comprises an outer tip 4, a modified slurry tip 36, and an inner tip 8, which are all individually connected to supply conduits 34 via weld 26. The modified slurry tip 36 further comprises a wear insert 32. The centering ribs 14 disposed between the inner tip 8 and the modified slurry tip 36 extends through assembly slots in the wear insert 32.

The wear insert 32 (hereinafter referred to as "insert") can comprise a material that exhibits greater erosion resistance than the modified slurry tip 36. Applicable materials are metallic compounds, such as, but not limited to: silicon-carbide, alumina, silicon-nitride, chromium-nitride, zirconia, tungsten-carbide, and so forth, as well as combinations comprising at least one of the foregoing. The erosion-resistant material employed can comprise Rockwell hardness (measured on the C-scale) of about 50 to about 90, or more specifically, about 60 to about 85, or even more specifically, about 70 to about 80. In addition, the wear material can be capable of enduring continuous use temperatures from about 70° F. to about 1,200° F. (about 21° C. to about 649° C.)

The material employed for the insert 32 can also comprise additives. Additives, such as, but not limited to, fibrous materials (e.g., silicon carbide fibers), powders, particulate, intumescent materials (e.g., a material that comprises vermiculite component, i.e., a component that expands upon the application of heat), ceramic materials, organic binders, inorganic binders, and the like, as well as combinations comprising at least one of the foregoing materials. In one embodiment, for example, the wear insert 32 can comprise an alumina matrix comprising silicon carbide fibers. If additives are incorporated within the erosion-resistant material, the additives can be added by volumetric percent (vol. %), based on total volume, and comprise less than or equal to about 30 vol. %, or more specifically, less than or equal to about 20 vol. %, or even more specifically, less than or equal to about 10 vol. %.

Figure 3:
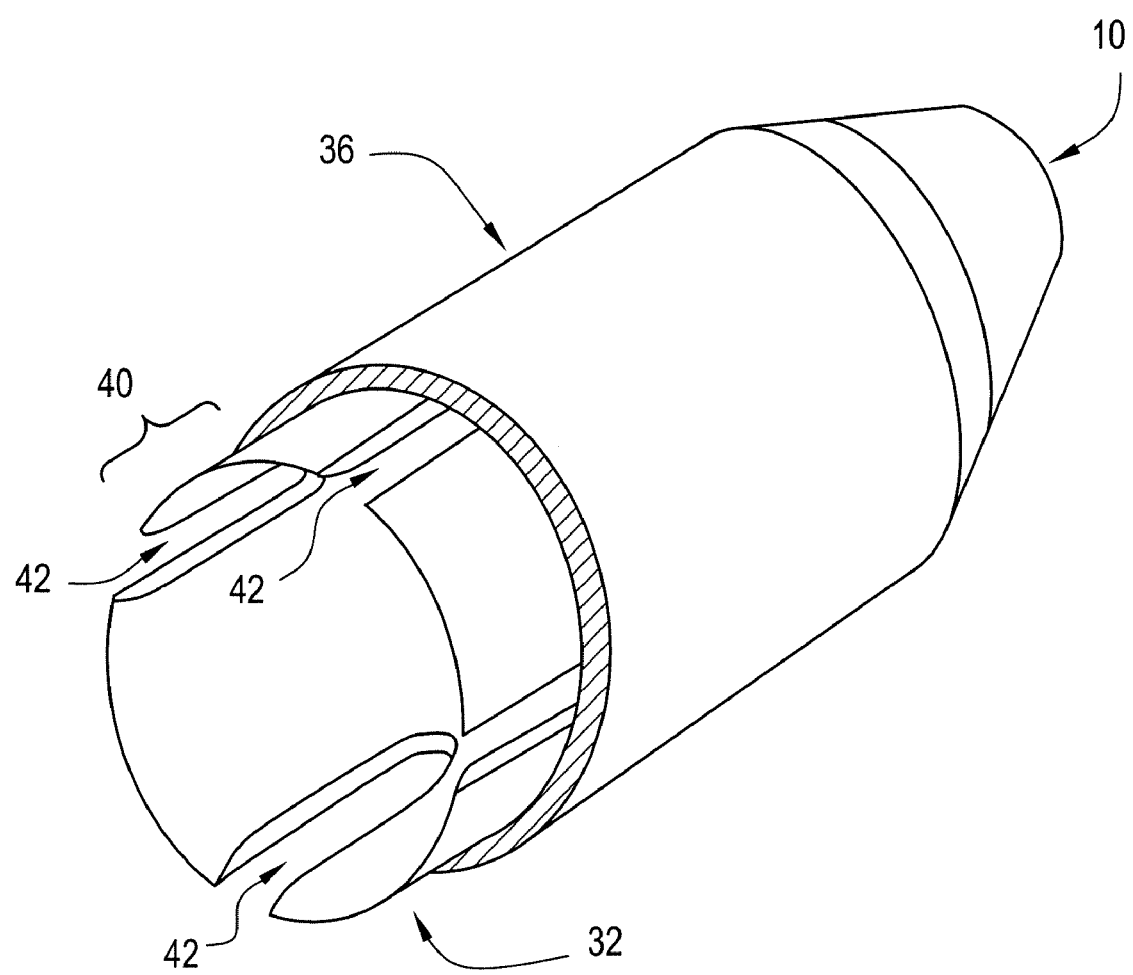
FIG. 3 is an oblique view of a modified slurry tip.

Referring now to FIG. 3, an oblique view of an assembled modified slurry tip 36 and insert 32. In the illustration, the insert 32 is disposed within the modified slurry tip 36. The insert 32 comprises an extending portion 40 that protrudes from the slurry insert 32. The extending portion 40 comprises assembly slots 42 that are disposed in an annular array around the portion 40. In the embodiment illustrated, the four assembly slots 42 are configured to be assembled within corresponding centering ribs 14 extending from the inner tip 8 (see FIG. 2).

The assembly slots 42 allow for the insert 32 to be retained (e.g., axially and/or rotationally) and/or positioned within the modified slurry tip 36 (when assembled, see FIG. 2). Therefore, the assembly slots 42 and centering ribs 14 can comprise mating geometries. As previously discussed, the geometries of the assembly slots 42 and the centering ribs 14 can have any geometry that can provide a means to center the tips and retain the insert 32. In addition, the assembly slots 42 and centering ribs 14 can be configured to comprise geometries that are capable of resisting damage (e.g., cracking and/or chipping) to the assembly slots 42 if forces (e.g., vibration and/or thermal expansion) are applied to the insert 32. Suitable geometries can have adequate contact area to distribute forces acting on the insert 32 to resist damage. Furthermore, in conjunction or separately, suitable geometries that do not comprise sharp comers and/or sharp radii (e.g., a radius less than or equal to about 0.010 in (0.25 mm)) can further reduce the potential of causing damage to the insert 32 when acted upon by a force, as sharp comers and/or sharp radii can act as stress concentrators that initiate cracks. For example, an assembly slot 42 having a geometry that is one-half of an ellipse (i.e., an ellipse truncated on its minor axis) is less prone to cracking than an assembly slot 42 comprising a triangular geometry.

The tips and centering ribs 14 can be produced via casting processes (e.g., investment casting, sand casting, resin shell casting, and/or centrifugal casting) and powder metallurgy processes. Machining processes (e.g., milling, EDM, turning, and/or grinding) can also be employed; however, as hardness increases, machining processes that employ metal cutting bits can become increasingly more difficult to employ without damaging the cutting bit. In one exemplary method of manufacture, the outer tip 4, modified slurry tip 36, and inner tip 8 are individually formed using an investment casting (e.g., lost wax) process.

Once formed, the tips and/or ribs can undergo secondary operations prior to assembly. Secondary operations can comprise operations such as, but not limited to: cleaning (e.g., ultrasonic or solvent bath), surfacing (e.g., grit blasting, EDM, grinding or polishing), coating (e.g., thermal barrier coatings or protective coatings), machining (e.g., EDM or grinding), property modification (e.g., heat treating, peening, or case hardening), and so forth. In this specific example, the tips are surface ground to remove die lines and cylindrically ground to conform to dimensional specifications.

The centering ribs 14 can be joined to the tips (see FIG. 2) and/or integrally formed with a tip during the casting process. To join a centering rib 14 to a tip, welding/brazing processes are employed. Suitable welding/brazing processes can comprise, but are not limited to: gas-tungsten-arc, microplasma, electron-beam, laser beam, and so forth. The welding and/or brazing processes can form an autogenous weld or employ a filler material (e.g., welding/brazing rod, brazing paste, or brazing foil). In one embodiment, a microplasma arc-welding process can be employed to join four centering ribs 14 to the inner tip 8 and outer tip 4 in an annular array about the tip at positions that are indexed about 90° from one another. As is shown in FIG. 1 and in FIG. 2, the centering ribs 14 can be attached in any configuration. For example, in FIG. 1, centering ribs 14 are joined to the slurry tip 6, however, in FIG. 2, the centering ribs 14 are joined to the inner tip 8.

In use, the modified injector 30 provides improved erosion resistance compared to the standard injector 2. To be more specific, as the slurry passes through the flow channel 18 and contacts the inside surfaces 24 of the insert 32, the slurry erodes the insert 32 at a slower rate than the slurry tip 6. For example, in a specific embodiment, a coal slurry comprising about 60% solids is passed through a standard injector 2 comprising a cobalt-chromium slurry tip 6, the slurry tip 6 will erode at a rate of about 0.1 inch per year. However, if this slurry is passed through a modified injector 30 comprising a silicon-carbide wear insert 32, the wear insert 32 will erode at a rate of about 0.028 inches per year. Therefore, the wear insert exhibits an erosion rate that is equal to or less than about 0.07 inches per year, or more specifically, less than or equal to about 0.05 inches per year, or even more specifically, less than or equal to about 0.03 inch per year. This corresponds to about a 72% increase in service life of the silicon-carbide wear insert 32 compared to the cobalt-chromium slurry tip 6.

The modified injector 30 can be configured in many configurations to provide alternative assembly and/or manufacturing methods. In addition, the modified injector 30 can be reconfigured to reduce cost, to improve erosion resistance of additional surfaces, and so forth.

Figure 4:
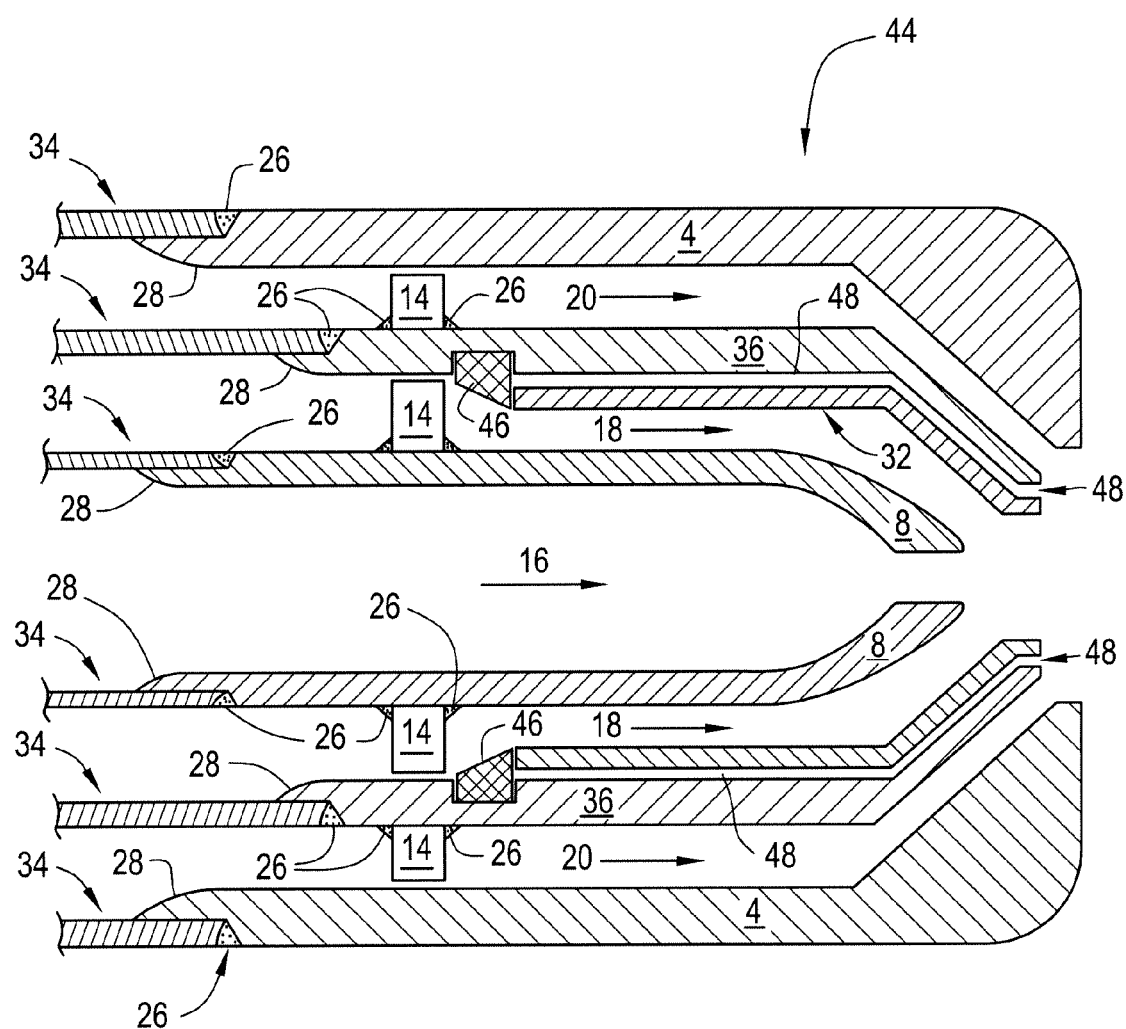
FIG. 4 is a cross-sectional view of an exemplary modified injector.

In one embodiment, the modified injector 30 can be configured to provide serviceability (e.g., disassembly, reassembly, interchangeability, reparability, or modification). Refer now to FIG. 4, illustrating a cross-sectional view of an exemplary modified injector 44. In the illustration, the modified injector 44 comprises a retention ring 46 that is employed to secure the wear insert 32 in place. To service the modified injector 44, a quick release mechanism (e.g., threaded connectors) can be connected to the supply conduits 34 some distance from the tips that can be disconnected (not shown). Once disconnected, the inner tip 8 can be removed from the modified slurry tip 36, and the modified slurry tip 36 can be removed from the outer tip 4. Thereafter, a retention ring removal tool can be inserted through the supply conduit 34, attached to the modified slurry tip 36, and the retention ring 46 can be removed. The insert 32 and the retention ring 46 can be replaced and the injector can then be reassembled.

In yet another embodiment, the modified slurry tip 36 can be reconfigured with alternative methods of retaining the insert 32 using alternative retention elements such as, but not limited to: step(s), bump(s), rib(s), angle(s), crimp(s), stamping(s), lip(s), swage(s), ring(s), mount(s), fastener(s), press-fit(s), screw(s), snap(s), clamp(s), bolt(s), pin(s), dowel(s), rivet(s), weld(s), and so forth, as well as combinations comprising at least one of the foregoing.

In another embodiment, the standard injector 2 (see FIG. 1) can be retrofitted with a modified slurry tip 36 and wear insert 32.

The modified injector 30, 44 can be further modified to comprise a gap 48 disposed between the modified slurry tip 36 and the wear insert 32, which can reduce the risk of damage to the insert 32 caused by thermal expansion, shock, vibration, and so forth. In another embodiment, a cushioning material can be disposed in the gap 48 to provide cushioning for the insert 32. The cushioning material can comprise any material(s) that can withstand the temperatures at which the modified slurry tip 36 operates and can cushion the wear insert. To be more specific, the cushioning material can comprise: fibers (e.g. metal fibers, metal oxide fibers, ceramic fibers, mica fibers, and/or vermiculite fibers), fabrics (e.g., ceramic fabrics and/or metal fabrics), preforms (e.g., thermoset preforms and/or ceramic preforms), foams (e.g., polymer foams and/or ceramic foams), particulates (e.g., flakes, fibrous bundles, and/or particles), and so forth, as well as combinations comprising at least one of the foregoing.

In yet another embodiment, if the coefficients of thermal expansion of the modified slurry tip 36 and wear insert 32 are similar, the insert 32 can be bonded to the modified slurry tip 36 using brazing paste and/or brazing foil (i.e., "similar" is interpreted to mean that during a first thermal expansion the modified slurry tip 36 will not impart damage to the insert 32 that hinders function). To do so, brazing foil and/or paste can be disposed between the insert 32 and modified slurry tip 36 and then the insert 32 and modified slurry tip 36 can be assembled. The assembly can then be heated to weld the component together. It is noted that either component or both, can be pretreated and/or modified to improve the bond strength of the weld. For example, the modified slurry tip 36 can be modified to comprise a brazing paste well and grit-blasted to have a roughened surface comprising an arithmetical mean roughness (Ra) of about 100 micrometers (μm) prior to brazing.

In yet another embodiment, an erosion-resistant component can be employed to provide improved injector service life. Referring again to FIG. 1, the erosion-resistant component can comprise a slurry tip 6 produced from an erosion-resistant material (e.g., silicon carbide). The erosion-resistant tip can be formed utilizing casting and/or machining methods and assembled to a supply conduit 34 via a welding/brazing process (e.g., microplasma brazing). In yet another embodiment, an inner tip 8, slurry tip 6, and outer tip 4 can be individually cast from alumina comprising 10% by weight (wt %) silicon carbide fibers having a length of about 0.10 inches (0.25 mm). The inner tip 8 and the outer tip 4 are cast to comprise three centering ribs 14 having a tear-drop shaped cross-sectional area and are capable of centering the injector assembly by contact with the slurry tip 6. All of the tips can be welded/brazed to corresponding supply conduits 34.

Although the injectors (e.g., standard injector 2, modified injector 30, modified injector 44) illustrated and discussed herein to comprise three flow channels (16, 18, 20), the injectors can be configured to comprise any number of flow channels. For example, a slurry injector can comprise two flow channels, wherein an inner tip 8 is employed for oxygen and a second tip (e.g., a modified slurry tip 36/insert 32 assembly) is employed for conveying a coal slurry. In another embodiment, only one flow path is employed, wherein a modified slurry tip 36/insert 32 assembly is employed for conveying a coal slurry.

The erosion-resistant slurry injectors (e.g., modified injector 30, modified injector 44) described herein provide for longer service life compared to injectors that do not comprise erosion-resistant materials. This provides reduced maintenance costs and improved overall operating availability.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An injector, comprising:
an inner tip comprising a first flow channel therein;
a first supply conduit attached to the inner tip, wherein the first supply conduit can supply a first media to the first flow channel;
a slurry tip disposed around the inner tip forming a second flow channel between the slurry tip and the inner tip;
a second supply conduit attached to the slurry tip, wherein the second supply conduit can supply a second media to the second flow channel; and,
a wear insert disposed within the slurry tip and in contact with the second flow channel, wherein the wear insert comprises a metal oxide, and wherein the wear insert comprises an assembly slot disposed therein.

2. The injector of claim 1, wherein the wear insert comprises an erosion rate equal to or less than about 0.07 inches per year.

3. The injector of claim 1, wherein the wear insert comprises an erosion rate equal to or less than about 0.05 inches per year.

4. The injector of claim 1, wherein the wear insert comprises an erosion rate equal to or less than about 0.03 inches per year.

5. The injector of claim 1, wherein the wear insert further comprises silicon-carbide fibers.

6. An injector, comprising:
an inner tip comprising a first flow channel therein;
a first supply conduit attached to the inner tip, wherein the first supply conduit can supply a first media to the first flow channel;
a slurry tip disposed around the inner tip forming a second flow channel between the slurry tip and the inner tip;
a second supply conduit attached to the slurry tip, wherein the second supply conduit can supply a second media to the second flow channel;
a wear insert disposed within the slurry tip and in contact with the second flow channel, wherein the wear insert comprises a metal oxide; and
a cushioning material disposed between the slurry tip and the wear insert.

7. The injector of claim 1, wherein the wear insert and the slurry tip are joined together via welding or brazing.

8. The injector of claim 1, further comprising a retention ring disposed within the slurry tip, wherein the retention ring can impede disassembly of the wear insert and slurry tip.

9. The injector of claim 1, further comprising;
a centering rib disposed between the inner tip and the slurry tip.

10. The injector of claim 9,
wherein the centering rib is disposed within the assembly slot; and,
wherein the centering rib can impede disassembly of the wear insert and the slurry tip.

11. A method of injector operation, comprising:
passing a first media through a first flow channel, wherein the first flow channel is within an inner tip;
passing a second media through a second flow channel, wherein the second flow channel is disposed between the inner tip and a slurry tip;
wherein the slurry tip comprises a wear insert disposed in contact with the second media, and wherein the wear insert comprises an assembly slot disposed therein; and,
mixing the first media and second media.

12. The method of injector operation of claim 11, wherein the wear insert comprises an erosion rate equal to or less than about 0.07 inches per year.

13. The method of injector operation of claim 11, wherein the wear insert comprises an erosion rate equal to or less than about 0.05 inches per year.

14. The method of injector operation of claim 11, wherein the wear insert comprises an erosion rate equal to or less than about 0.03 inches per year.

15. The injector of claim 1, further comprising a retention element disposed within the assembly slot.

16. The injector of claim 1, further comprising a cushioning material disposed between the slurry tip and the wear insert.

* * * * *